UNITED STATES PATENT OFFICE.

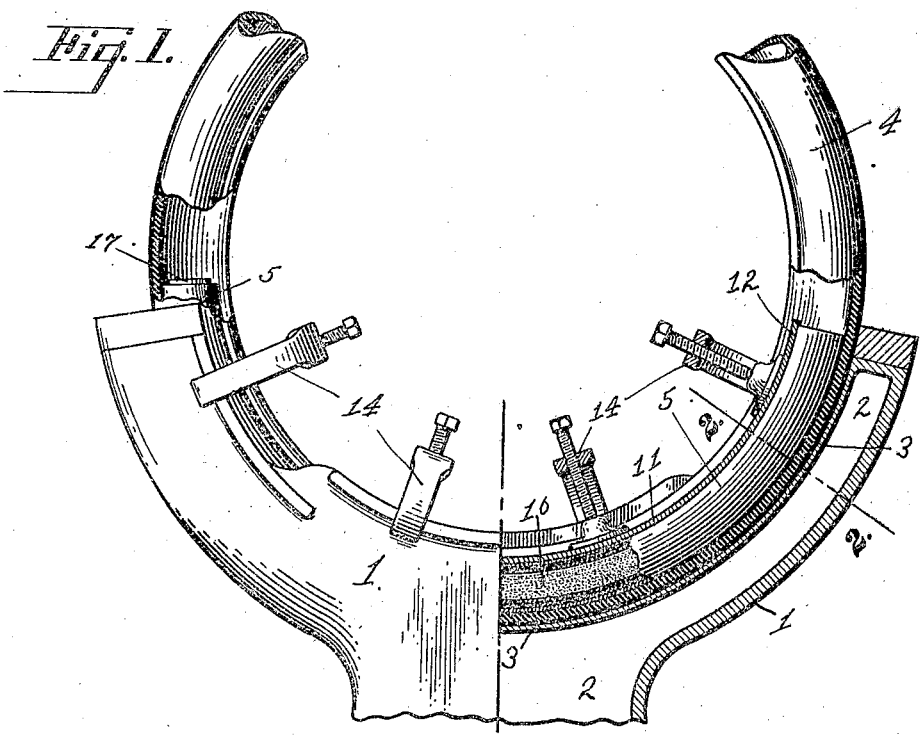
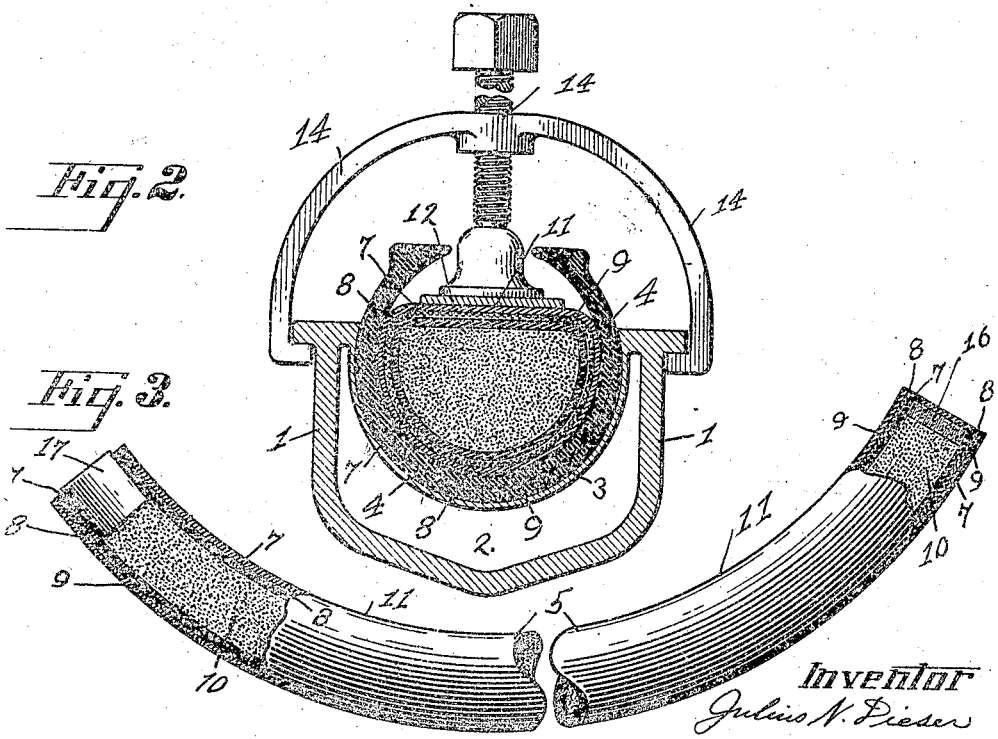

JULIUS N. DIESER, OF SAN FRANCISCO, CALIFORNIA, ASSIGNOR OF ONE-HALF TO ALBERT L. SILVERSTEIN, OF SAN FRANCISCO, CALIFORNIA.

VULCANIZING-PAD.

1,353,383.

Specification of Letters Patent. Patented Sept. 21, 1920.

Application filed March 30, 1920. Serial No. 370,288.

*To all whom it may concern:*

Be it known that I, JULIUS N. DIESER, a citizen of the United States, residing in the city and county of San Francisco, State of California, have invented a new and useful Improvement in Vulcanizing-Pads, of which the following is a specification.

My invention relates to improvements in vulcanizing pads wherein a flexible casing is filled with a granular filling adapted to distribute pressure equally upon the surface of an object to be vulcanized.

The objects of my invention are;

First, to provide a vulcanizing pad adapted to readily conform to the contour of the object to be vulcanized.

Second, to provide a vulcanizing pad of durable character adapted to withstand constant usage.

Third, to provide a pad of substantially the same character of material as that which is to be vulcanized.

Fourth, to provide a vulcanizing pad adapted to receive pressure evenly from a clamping means and impart said pressure equally against all points of the surface to be vulcanized.

I accomplish these and other objects by means of the device disclosed in the drawings forming a part of the present specification wherein like characters of reference are used to designate similar parts throughout said specification and drawings, and in which—

Figure 1 is a broken side elevation of a vulcanizing mold for retreading automobile tires, portions being broken away and shown in section to disclose the application of my improved vulcanizing pad as adapted thereto.

Fig. 2 is a sectional view taken along the line 2—2 of Fig. 1.

Fig. 3 is a broken side elevation of my vulcanizing pad, portions being shown in section to disclose the construction thereof.

In repairing and retreading automobile tires and the like, the practice has been to clamp the tire in a steam jacketed mold of the type disclosed, wherein the heat applied serves to vulcanize suitable materials supplied therein, and form a new tread upon said tire, or repair such portion of the tire as may be desired. In clamping the tire within the mold it was formerly the practice to insert a core of iron or other rigid material within that portion of the tire to be vulcanized, against which clamps were caused to exert the desired pressure.

Variations in thickness of the core, the tire, the vulcanizing materials, or the mold prevent an even and equal distribution of pressure when a rigid core of this character is used. In the present practice a core formed of a canvas casing filled with sand is frequently substituted for the rigid core of iron. A pad of this character rarely lasts for more than three or four operations, and a bunching of the sand within the canvas often prevents equal distribution of pressure. My invention provides a core, or vulcanizing pad of a character adapted to overcome the objectional features of the types of pad now in use.

Referring to the drawings the numeral 1 is used to designate in general a mold provided with a steam chamber 2 adapted to heat a concave retreading surface 3, of approximately the curvature of a tire 4 to be vulcanized therein. Within the tire 4 and bearing against that portion of said tire which is in contact with the heating surface 3, is applied a vulcanizing pad 5 comprising a casing 6 formed of an inner layer 7 of a suitable flexible material, an intermediate layer 8 of fabric or other suitable binding material of a pliable nature, and an outer layer 9 of a suitable heat insulating material such as asbestos, said casing 6 being filled with a granular filling 10, preferably sand. The casing 6 is provided at the upper portion thereof with a flattened surface 11, serving as bearing surface for a rigid clamping strip 12 against which pressure is applied by suitable clamps 14. One end of the casing 6 is closed by means of a plug 16 permanently vulcanized therein; the other end being closed by a cylindrical plug 17 removably retained therein by friction against the walls of the casing 6.

The inner wall 7 of the casing 6 is made preferably of vulcanized rubber, which also serves as a binding material for a plurality of layers of fabric forming the intermediate layer 8 of said casing 6. The outer wall 8 is made preferably of asbestos which adds slightly to the rigidity of the casing and as a heat insulator prevents overheating of the rubber, thereby causing said rubber to become hard or brittle. The rubber fabric and asbestos are vulcanized together to form a wad for the casing. In this manner an extremely tough casing is formed, adapted to withstand long and constant usage and at the same time of a pliability adapted to readily conform to the contour of the tire to be vulcanized. The construction has the further advantage of being formed of substantially the same materials as the tires with which the casing is used, thereby preventing friction against the inner wall of the tire due to expansion to a greater or lesser degree than said tire when subjected to the heat process. The granular filling lends itself readily to variations in the thickness of the tire with which the pad is used, and slight irregularities in any of the bearing surfaces are taken up and pressure imparted equally at all points.

The flattened surface 11 is adapted to form a stable bearing surface for the pressure from the clamps 14 is distributed evenly for the entire length of the pad and for a width sufficient to insure efficient application of pressure upon the entire bearing surface of the pad. The flattened surface also facilitates the application of the pad to the tire and the withdrawal therefrom by providing a diameter smaller than the inner diameter of the tire.

Having thus described my invention, what I claim as new and desire to secure by Letters Patent is:

1. A vulcanizing pad comprising a flexible casing formed of a plurality of fabric layers embedded in a lining of vulcanized rubber, said casing being closed at one end thereof and provided with a flattened pressure receiving surface on the upper portion thereof; a granular filling within said casing; and means for retaining said filling within the casing.

2. A vulcanizing pad comprising a flexible casing formed of an inner lining of vulcanized rubber, an intermediate layer of fabric, and an outer layer of a heat insulating material, said layers being vulcanized to form a wall for said casing; a granular filling within said casing; and means for retaining said filling within the casing.

3. A vulcanizing pad comprising a flexible casing formed of an inner lining of rubber, an intermediate layer of fabric, and an outer layer of asbestos, said layers being vulcanized to form a wall for said casing; a granular filling within said casing; and means for retaining said filling within the casing.

4. A vulcanizing pad comprising a flexible casing closed at one end thereof, and having a flattened pressure receiving surface on the upper portion thereof, said casing being formed of an inner lining of rubber, an intermediate layer of fabric, and an outer layer of asbestos, said layers being vulcanized to form a wall for said casing; a granular filling within said casing; and means for retaining said filling with the casing.

5. A vulcanizing pad comprising a flexible casing closed at one end thereof, and having a flattened pressure receiving surface on the upper portion thereof, said casing being formed with an inner lining of rubber, an intermediate layer of fabric and an outer layer of asbestos, said layers being vulcanized to form a wall for said casing; a granular filling within said casing; and a plug engaging the open end of the casing for retaining said granular filling within said casing.

6. A vulcanizing pad comprising a flexible casing closed at one end thereof, and having a flattened pressure receiving surface on the upper portion thereof, said casing being formed with an inner lining of rubber, an intermediate layer of fabric and an outer layer of asbestos, said layers being vulcanized to form a wall for said casing; a granular filling within said casing; and a plug removably engaging the open end of the casing for retaining said granular filling within said casing.

7. A vulcanizing pad comprising a flexible casing closed at one end thereof, and having a flattened pressure receiving surface on the upper portion thereof, said casing being formed with an inner lining of rubber, an intermediate layer of fabric and an outer layer of asbestos, said layers being vulcanized to form a wall for said casing; a granular filling within said casing; and a cylindrical plug removably engaging the open end of the casing for retaining said granular filling within said casing.

In witness whereof I hereunto set my signature.

JULIUS N. DIESER.